United States Patent [19]

Reich

[11] 4,415,410

[45] Nov. 15, 1983

[54] FORMING OF TETRABASIC LEAD SULFATE BATTERY ELECTRODES

[75] Inventor: Gregory N. Reich, Norristown, Pa.

[73] Assignee: Allied Corporation, Morristown, N.J.

[21] Appl. No.: 470,346

[22] Filed: Feb. 28, 1983

[51] Int. Cl.$^3$ .................... H01M 10/12; H01M 10/44
[52] U.S. Cl. ............................. 204/2.1; 252/182.1; 429/227
[58] Field of Search ................ 204/2.1; 429/227; 264/345; 252/182.1

[56] References Cited

U.S. PATENT DOCUMENTS

| | | | |
|---|---|---|---|
| 3,194,685 | 7/1965 | Malloy | 252/182.1 |
| 3,765,943 | 10/1973 | Biagetti | 429/227 |
| 3,788,898 | 1/1974 | Yarnell | 204/2.1 |
| 3,899,349 | 8/1975 | Yarnell | 264/345 |
| 4,331,516 | 5/1982 | Meighan | 429/227 |
| 4,338,163 | 7/1982 | Rittenhouse | 252/182.1 |

*Primary Examiner*—T. M. Tufariello
*Attorney, Agent, or Firm*—James P. DeClercq

[57] ABSTRACT

A method of forming battery plates or electrodes from tetrabasic lead sulfate includes the step of adding a lead peroxide such as lead dioxide in powdered form to the tetrabasic lead sulfate for making the paste to be applied to the plate or electrode supporting grids. The addition of this lead peroxide allows forming the plates or electrodes in an electrolyte of high specific gravity, and in reduced time, with increased efficiency and reduced energy consumption. Such battery plates or electrodes may thus be formed in their final containers or jars, significantly reducing the practical problems of disposing of used forming electrolyte solution.

7 Claims, No Drawings

FORMING OF TETRABASIC LEAD SULFATE BATTERY ELECTRODES

BACKGROUND OF THE INVENTION

This application relates to the forming of batteries including tetrabasic lead sulfate plates. In particular, the application relates to the addition of a lead peroxide such as lead dioxide to the electrode paste to allow forming of battery plates in the battery container itself. The use of tetrabasic lead sulfate, chemical formula $4PbO \cdot PbSO_4$, has been determined to be a useful starting material for the preparation of electrodes in use in lead-acid batteries. As disclosed in U.S. Pat. No. 3,765,943, issued to Biagetti on Dec. 9, 1970, entitled "FABRICATION OF LEAD-ACID BATTERIES," and in U.S. Pat. No. 3,899,349, issued to Yarnell on Aug. 12, 1975, entitled "CARBON DIOXIDE CURING OF LEAD-ACID BATTERIES," hereby incorporated by reference, battery plates or electrodes fabricated with tetrabasic lead sulfate produce an increased product yield, greater life, greater reproducibility in the chemical and physical properties of the product, and crystal morphology more suitable to battery operation. Such characteristics are most desirable in batteries intended for float or standby service, where extremely long life, in excess of thirty years, is desired.

It should be noted that both positive and negative electrodes may be formed with tetrabasic lead sulfate, although it is preferred that tetrabasic lead sulfate be used only for positive electrodes, because of the greater energy required to form negative electrodes with tetrabasic lead sulfate as a starting material, and because conventional negative electrodes have generally satisfactory characteristics, in terms of growth and shedding of active material, etc.

In forming or charging a battery, the desired result is a positive plate or electrode having lead dioxide as the active material, and a negative plate or electrode having metallic sponge lead as the active material. For negative plates or electrodes, it has been found more practical to start with a mixture of lead and lead oxides, known as "leady oxides" containing approximately 30 percent metallic lead particles.

The preparation of active electrodes or plates for lead acid batteries involves three general steps. The first, a paste is applied to a supporting grid, the pasted grid is cured and dried, and the cured grid is formed to produce the active material used in the charged lead-acid battery. Formation is usually performed by electrolytic formation, by passing current through the electrode, to cause the material of the electrode to react with the electrolyte to form the desired materials in the electrodes. This process is akin to charging a battery in use, except that the initial formation of the desired active materials requires much greater care to produce a desirable structure for the battery plates. The desired end result is a negative plate or electrode having pellets of sponge lead, and a positive plate or electrode having pellets of lead oxide.

It has been stated that the only parameters relevant to mixing of paste for tetrabasic lead sulfate plates or electrodes are the amounts of tetrabasic lead sulfate and water, and the length of time mixed, by C. F. Yarnell, Abstract No. 32, issued October, 1974, New York Electrochemical Society Meeting.

When the water is first added, the mix appears very dry. After continued mixing, the mixture starts to form into small balls, the small balls coalescing into larger balls until the mixture becomes a single mass. As the paste is mixed beyond this point, it becomes more fluid, eventually becoming too fluid to use, regardless of the amount of water used to make the paste, as long as a minimum amount is used.

The paste is then applied to an electrode, typically in the form of a grid work formed of metallic lead or a lead alloy. The pasted plate or electrode is then dried and cured.

Curing may be performed in the manner shown in U.S. Pat. No. 3,899,349 above, or in accordance with U.S. Pat. Nos. 4,331,516 and 4,338,163, in that powdered ammonium carbonate would then be added to the paste constituents.

Then, conventionally, the plates or electrodes are formed to convert the tetrabasic lead sulfate to lead dioxide, for a positive plate, prior to assembly in forming tanks. A fully formed battery may have any desired electrolyte specific gravity. However, it was believed that tetrabasic lead sulfate plates could not be formed practically in the presence of an electrolyte having a high specific gravity.

Positive plates made from tetrabasic lead sulfate paste are conventionally formed, prior to assembly, in a bath of electrolyte having a specific gravity ranging from 1.005 to 1.015, a process requiring between sixty and seventy-two hours at a conventional current of 9 amperes per plate. The time and current figures are typical for plates for a commercially-available cylindrical cell. If the electrolyte specific gravity is increased beyond 1.015, the forming rate diminishes rapidly, such that using an electrolyte specific gravity of 1.050 requires a forming time of two hundred and eighty to three hundred and forty hours. Since a much longer time is required at the same current, it will be apparent that much energy is wasted, a high specific gravity process consuming nearly five times the energy of a low specific gravity process. At the same time, a heavy coating of lead sulfate is formed on the plate surface. This lead sulfate coating falls from the plate surface, and deposits a layer of sludge in the formation vessel.

As is known, there is some sulfuric acid effectively present in all such unformed plates. In conventional plates, sulfuric acid is added when mixing the plates, making them self-curing. In tetrabasic lead sulfate plates, the sulfuric acid exists in the form of sulfate ($SO_4$) loosely bound to the tetrabasic lead. When placed in a small volume of electrolyte, such as in the final container or jar, this fixed amount of acid also results in a high initial specific gravity.

These problems of sludge formation and energy inefficiency thus effectively preclude formation of the battery plates in their final container, since the excessive sludge would virtually assure premature failure due internal shorting, while the wasted energy, in the form of heat, would readily generate temperatures in the confined area of the final container, commonly referred to as a jar, capable of damaging the cell.

Therefore, tetrabasic lead sulfate battery electrodes are conventionally formed in forming tanks of large volume, so that inherent sulfuric acid in the plates cannot cause a high electrolyte specific gravity, with larger heat dissipation area, and where the lead sulfate sludge can be removed. After forming, the electrodes are removed and stored pending assembly into finished batteries. Inherent in the process is exposure to lead dust, sulfuric acid and acid mist to those working around the forming tanks and inserting and removing the electrodes, and also in disposing of waste acid and cleaning the sludge from the formation tanks. The forming electrolyte is normally discarded, due to presence of suspended lead sulfate. This combination of caustic acid and toxic metal presents a costly problem of safe disposal. This process also creates other problems, in that reliable connections between electrodes in the forming tank are difficult to insure, and that the formed electrodes must be kept from drying unevenly before assembly into a battery and final charging. The process of assembling the battery adds yet another opportunity for worker exposure to acid and lead dust.

SUMMARY OF THE INVENTION

It has been found that the addition of lead dioxide to the powdered tetrabasic lead sulfate in mixing the battery paste overcomes the deficiencies of conventional processes.

It has been found that a process according to the invention maintains the energy efficiency of formation in low specific gravity electrolytes when forming battery electrodes in elevated specific gravity electrolytes, overcomes the inhibition of formation rate when forming with elevated specific gravity electrolytes, and reduces or totally eliminates scaling of lead sulfate from the plate surface. As a result, tetrabasic lead sulfate battery electrodes can be formed in their final container or jar, eliminating substantial amounts of handling involved with loading and unloading plates, and the inherent risks of exposure to lead dust, sulfuric acid and acid mist.

Also, since standard formation tanks and fixturing can be eliminated, and formation in final containers or jars requires only about one-third of the floor area required by forming tanks, substantial capital savings are possible. In addition, used acid, remaining clean, may be reused, and need no longer be discarded after being used to form a batch of tetrabasic lead sulfate battery plates. A process according to the invention also yields a better battery, since the electrodes are permanently inteconnected at the time of their forming, rather than being temporarily and unreliably connected together in a formation tank, so that all electrodes can be formed equally. A further advantage of the invention is that plates can no longer be damaged by uncontrolled drying between the times of formation and assembly.

DETAILED DESCRIPTION OF THE INVENTION

In accordance with the invention, various amounts of lead dioxide were added to the powdered tetrabasic lead sulfate before mixing with water to form the electrode paste. Amounts ranging from 0 to 25 percent by weight were added to the tetrabasic lead sulfate before being mixed with water. Tetrabasic lead sulfate battery test electrodes containing up to 25 percent lead dioxide were cured in conventional fashion and initially successfully formed in electrolytes having specific gravities ranging from 1.005 to 1.050, with a formation time of approximately seventy-two hours at a current of 7 to 9 amperes per plate, with little variation in sulfation or formation characteristics across that range. With a lead dioxide content below about 4 percent, formation rate was found to decrease noticeably, with a lead dioxide content below about 2 percent, the formation rate decreased very rapidly to that of pure tetrabasic lead sulfate. Because of the rapid deterioration in formation rate with lead dioxide additive in an amount less than about 4 percent by weight, and considering acceptable compromises in material costs, acceptable formation times, residual sulfate levels and energy efficiency, this value was selected as an operating value, producing all the advantages of the invention, and not interfering with the desirable characteristics of a battery plate formed from tetrabasic lead sulfate.

Then tetrabasic lead sulfate was preblended with 4 percent lead dioxide, by weight, in the mixer. Water was then added, the paste was mixed, and the electrodes were pasted and cured in the usual manner. Batteries were then assembled using conventional techniques, but with unformed plates, which were then formed in their container or jar.

First, the jar was filled with 1.020 specific gravity sulfuric acid electrolyte, and the electrodes or plates were allowed to soak for about three or more hours. Then, the battery was formed by passing current through it. Due to the low heat dissipation volume of an assembled battery, the current chosen for formation of a battery embodying the invention was 5½ amps per plate, applied for approximately one hundred twenty hours, to limit the cell temperature to 130° F. At the end of the formation charge, the electrolyte specific gravity was approximately 1.070, a specific gravity increase of about 0.050, in contrast to the typical increase of 0.002 or 0.003 measured in tank formation. Then, the battery was discharged until its initial specific gravity, 1.020, was re-established. This step is not necessary, but is desirable to reduce the strength of the acid, so that it may be reused without further processing and with a minimum of further handling, and so that it is not unduly hazardous to handle.

The electrolyte is then removed. It should be noted that approximately one-half of the volume of the original electrolyte is retained within the battery, being trapped in the pores of the plates and separators. Then, sulfuric acid, with a specific gravity calculated to yield a specific gravity of 1.215 after charging (when mixed with the volume of acid at 1.020 specific gravity trapped within the battery) was poured into the battery. In an actual example, 32 liters of acid with a specific gravity of 1.020 was poured into a battery, and approximately 15 liters were recovered. It was calculated that sulfuric acid with a specific gravity of 1.315 would yield the desired final specific gravity.

Finally, the battery was charged to its full voltage, and subsequently subjected to conventional discharge-charge cycles to improve its structure and electrical capacity. After the completion of this process, the resulting battery was tested and found to be equivalent to a similar battery formed in the conventional manner.

It should be noted that the amount of initial formation electrolyte removed, and the specific gravity of the electrolyte that is subsequently added may vary with the size of the battery involved, and that the formation electrolyte may be removed at a specific gravity such as 1.070, reducing the amount of extra sulfuric acid to be added, but causing difficulties both in handling the stronger acid, and in the amount of dilution needed, and the resulting increase in volume when reducing its strength to the proper specific gravity for reuse.

Table I shows selected results of these tests, and prior data on electrodes made with pure tetrabasic lead sulfate. This table reflects the fact that only preliminary tests were performed in some instances, either because the initial test showed less than ideal results, or because of technical and economic disadvantages in using a large excess of lead dioxide. The use of more lead dioxide would allow forming at higher specific gravities, but the cost of this material and the decrease in plate strength at a higher lead dioxide percentage imposes practical limitations.

TABLE I

| Test No. | 1 | 2 | 3 | 4 | 5 | 6 |
|---|---|---|---|---|---|---|
| % PbO$_2$ | 0.0 | 0.5 | 1.5 | 4.0 | 13.0 | 25.0 |
| Weight, gm/in$^3$ | 68.6 | 69.9 | 68.8 | 69.5 | 69.3 | 69.8 |
| Penetrometer | 90 | 98 | 100 | 95 | 85 | 73 |
| Durometer | 40 | 56 | 62 | 47 | 47 | 45 |
| % Surface Sulfation | 100 | 95 | 90 | >50 | 0 | 0 |

The tests of Table I were made in a sulfuric acid electrolyte having a specific gravity of 1.080, with a formation rate of 2.1 amperes for 96 hours. Greater sulfation is indicative of less efficient formation. Table II presents other data obtained during the same test as presented in Table I, and shows the progress of formation with time, with different levels of lead dioxide initially mixed into the pure tetrabasic lead sulfate. As shown in Table II, higher levels of lead dioxide produce faster formation.

TABLE II

| | % Lead Sulfate | | | |
|---|---|---|---|---|
| % PbO$_2$ | 24 Hours | 48 Hours | 72 Hours | 96 Hours |
| 0.0 | 54 | 46 | 38 | 40 |
| 0.5 | 51 | 42 | 31 | 25 |
| 1.5 | 53 | 38 | 31 | 24 |
| 4.0 | 53 | 37 | 17 | 13 |
| 13.0 | 45 | 31 | 7.6 | 8.4 |
| 25.0 | 44 | 31 | 7.2 | 8.2 |

Tables III and IIIa below are produced from smooth and continuous curves relating formation time to the specific gravity of the sulfuric acid used and to the amount of lead dioxide additive used, at a formation rate of 7 amps per plate. As can be seen, there is a large difference in formation rate between no lead dioxide additive and 4 percent lead dioxide, and a comparatively small difference between the results of adding 4 percent and 10 percent lead dioxide additive. Tables III and IIIa also show the extreme sensitivity of formation rate to specific gravity with pure tetrabasic lead sulfate, and low sensitivity with a small addition of lead dioxide.

TABLE III

| Specific gravity | 1.005 | | | 1.015 | | | 1.020 | | |
|---|---|---|---|---|---|---|---|---|---|
| % PbO$_2$ | 0 | 4 | 10 | 0 | 4 | 10 | 0 | 4 | 10 |
| Time (hrs.) | 64 | 64 | 64 | 93 | 64 | 64 | 110 | 66 | 64 |

TABLE IIIa

| Specific gravity | 1.035 | | | 1.050 | | |
|---|---|---|---|---|---|---|
| % PbO$_2$ | 0 | 4 | 10 | 0 | 4 | 10 |
| Time (hrs.) | 170 | 73 | 64 | 288 | 85 | 64 |

Tables IV–IVb reflect the same tests as does Tables III and IIIa, but is produced from smooth and continuous curves relating time to complete formation to percentage of lead dioxide additive at three different acid specific gravities.

TABLE IV

| % PbO$_2$ | 0% | | |
|---|---|---|---|
| Specific gravity | 1.015 | 1.030 | 1.050 |
| Formation time (hrs.) | 82 | 144 | 288 |

TABLE IVa

| % PbO$_2$ | 4% | | |
|---|---|---|---|
| Specific gravity | 1.015 | 1.030 | 1.050 |
| Formation time (hrs.) | 64 | 70 | 88 |

TABLE IVb

| % PbO$_2$ | 10% | | |
|---|---|---|---|
| Specific gravity | 1.015 | 1.030 | 1.050 |
| Formation time (hrs.) | 65 | 65 | 65 |

The data set forth in Tables I to IVb was obtained using positive plates or electrodes as used in a cylindrical battery according to U.S. Pat. Nos. 3,765,943 and 3,899,349.

The data which follows was obtained with conventional rectangular plates, and differs slightly in magnitude. This difference is believed to be due to a more massive grid structure producing shorter effective electrical paths, thus providing greater conductivity and faster formation in the tests performed with these rectangular electrodes.

Table V shows the results of visual inspection of rectangular plates for the percentage of surface sulfation, (lead sulfate is visible as a white powder) after 96 hours at a forming current current of 2.1 amperes, in 1.080 specific gravity sulfuric acid, as a function of the percentage of lead dioxide additive to the tetrabasic lead sulfate.

TABLE V

| % PbO$_2$ added | 0 | 0.5 | 1.0 | 4.0 | 10.0 | 13 | 25 |
|---|---|---|---|---|---|---|---|
| % Sulfation (visual) | 100 | 95 | 90 | 50 | 6 | 0 | 0 |

Table IV shows sulfation in terms of the measured percentage of lead sulfate (PbSO$_4$) in the plates used for the tests of Table V, as a function of the percentage of lead dioxide seeding material.

TABLE VI

| % PbO$_2$ | 0 | 0.5 | 0.75 | 4 | 10 | 25 |
|---|---|---|---|---|---|---|
| % PbSO$_4$ | 40 | 25 | 24 | 13 | 8 | 8 |

As can be seen from the foregoing, the instant invention produces a well-formed battery plate or electrode in reduced time, saving energy, and in high specific gravity sulfuric acid, reducing the severity of the practical and environmental manufacturing and acid-handling problems mentioned above, and allowing formation of plates or electrodes in their final containers or jars.

In conclusion, the invention has been shown to produce a significant enhancement of formation rates over a broad range of acid concentrations and lead dioxide seeding levels. The effect of adding lead dioxide to tetrabasic lead sulfate increases rapidly with increasing lead dioxide levels until a saturation level is reached. Based on data presently available, and considering the differences in overall conductivity of different electrode or plate grid structures, there is no reason to believe that a fixed optimum lead dioxide percentage exists for all circumstances. While a 4 percent addition of lead dioxide was selected as an operating value, the selection of a practical optimum value is a pragmatic compromise of material cost, acceptable formation times, residual sulfate levels and energy efficiency.

It will be obvious to one skilled in the art that numerous modifications and variations of the invention may be made, including the use of lead compounds other than pure lead dioxide, without departing from the spirit and scope of the invention.

What is claimed is:

1. A process for the fabrication of lead acid batteries including a container for containing negative electrodes and positive electrodes, including the step of coating at least one said electrode with a paste containing tetrabasic lead sulfate, lead dioxide and water, curing said plates, placing said plates and an acid electrolyte in said container, and forming said plates in said container.

2. A process according to claim 1, wherein said step of coating said electrode includes the step of coating said electrode with a paste containing between greater than 0 percent and 25 percent lead dioxide by weight of said tetrabasic lead sulfate, said tetrabasic lead sulfate and said water.

3. A process according to claim 2, wherein said step of coating said electrode includes the step of coating said electrode with a paste containing approximately 4 percent lead dioxide by weight of said tetrabasic lead sulfate, said tetrabasic lead sulfate and said water.

4. A paste for coating at least one electrode of a lead acid battery consisting of tetrabasic lead sulfate, lead dioxide and water.

5. A paste according to claim 4, wherein said paste includes between 2 percent and 25 percent lead dioxide by weight of said tetrabasic lead sulfate, said tetrabasic lead sulfate and said water.

6. A process for making a lead acid battery having a container for negative electrodes and positive electrodes, including the steps of:
coating at least one electrode with a paste containing tetrabasic lead sulfate and lead dioxide;
assembling said negative electrodes and said positive electrodes;
placing said negative electrodes and said positive electrodes in said container;
placing a first acid electrolyte solution in said container;
passing an electrical current through said negative electrode and said positive electrode and said first acid electrolyte to form said battery.

7. A process according to claim 6, including the steps of:
removing at least a portion of said first acid electrolyte;
placing a second acid electrolyte in said container, said second electrolyte having a higher specific gravity than said first electrolyte; and
charging said battery.

* * * * *